Patented Mar. 14, 1950

2,500,453

UNITED STATES PATENT OFFICE 2,500,453

PROTEIN REACTION PRODUCT PREPARATION

James P. Danehy, Riverside, Ill., assignor to Harris-Seybold Company, Cleveland, Ohio, a corporation of Ohio No Drawing. Application December 31, 1946, Serial No. 719,609

13 Claims. (Cl. 260—119)

In the treatment of proteins it has been customary to operate in aqueous medium, whether dispersion of the protein was desired or not. The aqueous medium introduces certain disadvantages, but has been employed largely because of its convenience, although usually involving an alkaline or acid reaction and modifying the protein correspondingly. Furthermore, when water in neutral condition is employed, as when it is desired to avoid acid or alkaline reaction upon the protein, certain proteins are not homogeneously dispersed but the granules thereof are merely swelled. When a reagent is added to such a mixture of water and swelled but undispersed protein, reaction with the protein is unsatisfactory, resulting in a non-homogeneous reaction product or requiring an undesirably long time or having some other undesirable condition. I have found that if proteins be dispersed in a non-aqueous dispersing medium which is substantially inert toward the protein, action may be then carried on with reagents changing the character of the protein in desired directions, with particular advantages and without detriment occasioned by water. I have further found that under proper conditions the dispersing medium may be eliminated or removed, leaving a reaction product involving primarily the protein and the reagent.

To the accomplishment of such and related ends, the present invention comprises the features hereinafter fully described, and particularly pointed out in the claims, the following description setting forth in detail certain illustrative embodiments of the invention, these being indicative however, of but a few of the various ways in which the principle of the invention may be employed.

The protein employed as raw material is casein from milk, and "vegetable casein" or protein of soya bean, peanut, and like oil seeds, all of these being hereinafter concisely designated as "casein-type proteins." The protein is brought into homogeneous dispersion in a non-aqueous dispersing medium which is substantially inert toward the protein. Any medium capable of dispersing the protein and compatible with the later applied reagent or reagents and with the result desired may be employed. Examples of suitable media are organic dispersing agents such as polyhydric alcohols, as ethylene glycol, other glycols, glycerol; acid amides, such as formamide, acetamide, propionamide, etc.; and phenols, such as phenol, resorcinol, etc., and for conciseness these are referred to hereinafter as "non-aqueous neutral organic dispersing mediums." Dispersion is accomplished by incorporating the protein in the dispersing medium with or without the application of heat as required. Where heating is required for advantageous results, it is desirable to control the heating so as to avoid undesired breakdown of the molecular structure of the protein. Thus as a practical matter it is usually desirable to not substantially exceed a dispersing temperature around 140° C., as higher temperatures tend undesirably to break-down the protein structure. Some latitude is involved, depending upon the particular protein operated upon. Lower temperatures may be employed, depending upon the time factor and the particular protein, and with modifying agents, such as urea, the dispersion of the protein may be easily and rapidly effected in the lower range of temperature, as around 125° C. and somewhat below. The amount of the dispersing agent relative to protein may vary somewhat, depending upon the protein and the particular dispersing agent, but in general enough is applied to give a practically fluent dispersion, and an excess in any considerable amount is undesirable as involving more liquid than would otherwise need to be handled and to be separated where the dispersing agent is finally separated from the finished product. And thus, amounts of glycol such as for instance 3 or 4 parts to 1 of casein or other protein, represent a satisfactory proportion which avoids undue slowness and thickness on one hand and undue excess of liquid on the other, as a practical matter of handling and operation.

With the protein dispersed in the dispersing medium, reagents are added to react upon the protein, and thus hardening agents may be applied, such being an aldehyde, for instance formaldehyde in any of its applicable forms, including linear and cyclic polymers, i. e. paraformaldehyde, trioxane, etc., also monomeric formaldehyde bubbled into the solution, and also other aldehydes or sources of aldehydes, as acetaldehyde, hexaldehyde, hexamethylenetetramine, glyoxal, etc. After the protein has been reacted upon as desired, the product may be separated from the dispersing medium, although in some cases it may be desired to maintain and apply the product in such liquid state or otherwise to incorporate all or a part of the dispersing agent in the final product. Separation of all or a part of the dispersing agent may be carried out in any suitable manner, but preferably this is accomplished by application of a precipitating agent, that is, an agent miscible with the dispersing medium and immiscible with the reaction product. After addition of such precipitating agent the reaction product may be obtained by filtering and the dispersing medium may be recovered in any suitable manner for further use. Dispersing agents such as the glycols, acid amides, and phenols are separable by application of acetone, alcohol, etc. as precipitating agent.

As an example: Into 600 parts by weight of ethylene glycol, casein in amount of 150 parts is stirred in as rapidly as possible, the temperature being around 140° C., and preferably not much above, and the casein is brought into complete dispersion to formation of a transparent fluid mass in about an hour or somewhat less. The heating is discontinued, and a slurry of 60 parts by weight of paraformaldehyde and 60 parts of ethylene glycol is rapidly stirred in. Reaction is evident immediately and the mass rapidly stiffens to a gel, even with the temperature still above 100° C. The stiff gel is allowed to cool to about room temperature and is then mixed, as by grinding in a ball mill, with acetone to precipitate the reaction product, and the material is filtered, washed with more acetone, and is dried. The product is a light brown powder.

As another example: 600 parts by weight of ethylene glycol is heated to about 100° C., and urea in amount of 30 parts is stirred in and dissolved heating being continued at a temperature of about 130°. 150 parts of casein are stirred in rapidly, and the temperature is adjusted to around 125° C. or somewhat below, and dispersion is accomplished in about 10 to 20 minutes, to a transparent solution of light yellow color. Heating is discontinued, and the liquid may be transferred to another vessel if desired. A slurry of 100 parts of paraformaldehyde and 100 parts of glycol is added to the liquid with very rapid stirring, and the material quickly thickens to a gel, although the temperature in the mass may still be over 100° C. The material is allowed to cool to room temperature and is mixed, as by grinding in a ball mill, with acetone, filtered and washed with more acetone and dried. The product is a white to cream-colored powder.

As another example: Casein dispersed as in the foregoing examples, is treated with hexaldehyde.

As a further example: 200 grams of phenol is heated to about 110° C. and 75 grams of casein is quickly added and stirred in. Addition of the relatively cool casein causes a drop in temperature of the phenol for example to about 90° C., at which temperature the casein becomes homogeneously dispersed in a few minutes. A slurry of 50 grams of phenol, heated to slightly above 41° C. to liquefy the same, and 40 grams paraformaldehyde is then stirred into the casein-phenol dispersion. Gelation occurs in about 30 seconds. The mass is then allowed to cool and is ground with acetone or alcohol in a ball mill until the casein reaction product is separated out as a fine precipitate. The precipitate is filtered, washed with more acetone or alcohol, and air dried.

Where employing an agent such as urea to reduce the temperature of dispersion, the amount may be varied, depending upon the protein and the particular results desired. Smaller amounts of urea give proportionally lesser effect in lowering the temperature requisite for dispersion. Excessive amounts of urea do no harm, and can be reacted upon by the aldehyde or other reagent present.

In its preferred form the invention contemplates the removal of all or substantially all of the urea or other modifying agent as well as the dispersing medium, whereby a substantially pure reaction product of the protein and the reagent involved is obtained. Thus, in the second example above, a urea-formaldehyde reaction product is formed, but such product, being soluble in acetone, is substantially entirely removed, as may be determined by adding a few drops of hydrochloric acid to the acetone washings to thereby precipitate out the urea-formaldehyde product. Such substantially pure protein-aldehyde product is altogether distinct from the urea-aldehyde products in which protein has been incorporated as previously known.

As indicated, the present process lends itself particularly well to application of aldehyde type reagents, and not only formaldehyde in its commercially available forms may be applied, but water-insoluble aldehydes may be applied with particular advantage. The amount of aldehyde in any given case may vary in accordance with the particular product in view, and for instance with paraformaldehyde with casein as in the first example above, a proportion of 40 parts of paraformaldehyde gives a less completely reacted product, while a proportion as high as 75 parts results in a slight excess. Where urea is applied as modifying agent, consideration should be given to the fact that a given weight of urea may react with an equal weight of formaldehyde, thereby reducing the amount of the latter available for reaction with the protein.

Rapidity and completeness of reaction are notable in the present process. Although the reasons for the improved results are not definitely known, and I do not wish to be limited by any theory, it is thought that the dispersing medium acts to break down the granules of protein into particles of molecular or near-molecular dimensions, and that the reagent is thereby enabled to come quickly into intimate and complete contact with the protein. It is also considered that, where the granules of protein are merely swelled, as when neutral water is employed, not only is it necessary for the reagent to diffuse into the granule if it is to react with the inner portions thereof, but also the reaction which occurs initially at the exterior layers of the granule may act to retard action upon the inner portions thereof. For example, the hardening effect of formaldehyde upon the outside layers of casein granules may to an extent insulate the inner portions from contact with the formaldehyde.

Products prepared with aldehydes or other hardening agents have plastic properties and may be formed into articles having superior characteristics. For instance, as a molding powder the compound formed by treatment of casein with formaldehyde may be molded at convenient temperature and pressure, satisfactory results being obtained at pressure of 5000 pounds per square inch, and temperature 125° to 150° C., in a treatment period of 2 to 3 minutes. An outstanding feature of reaction products in accordance with the present invention is the clear transparency attained, which is quite in contrast to casein molding powders usually. And in general, articles molded from the transparent product are transparent, amber-like in color, water-resistant, and hard. Instead of the natural color, pigments or dyes may be employed to a variation of colors as desired, wool dyes in general being satisfactory. By applying an acetone-soluble dye in the last washing of the product in acetone, the coloring of the product may be simultaneously effected, so that the molding powder is all ready for use in the color desired.

This application is a continuation, in part and as to common subject matter, of my application Serial No. 430,104, filed February 9, 1942, now abandoned.

Other modes of applying the principle of the invention may be employed, change being made as regards the details described, provided the features stated in any of the following claims, or the equivalent of such, be employed.

I therefore particularly point out and distinctly claim as my invention:

1. In a process of the character described, heating a non-aqueous liquid consisting of ethylene glycol, incorporating urea, and then with the temperature about 130° C. incorporating casein, adjusting the temperature to below about 125° C. for dispersion, adding a slurry of paraformaldehyde and ethylene glycol, cooling the mass, grinding with acetone, filtering, washing with acetone, and drying.

2. In a process of the character described, heating a mixture of 600 parts of a non-aqueous liquid consisting of ethylene glycol and about 20 to 40 parts urea to a temperature of about 130° C., incorporating casein, maintaining the mixture at a temperature for dispersion but not substantially exceeding about 125° C., adding an aldehyde and gelling the casein, cooling, and treating with a precipitating agent to separate the casein reaction product from the glycol.

3. In a process of the character described, heating non-aqueous glycol and urea, and then with the temperature about 130° C., incorporating casein, adjusting the temperature to below about 125° C. for dispersion, adding an aldehyde and gelling the casein, cooling, and separating the glycol.

4. In a process of the character described, dissolving casein by warming in a non-aqueous liquid consisting of a glycol at a temperature below boiling, adding an aldehyde and gelling the casein, cooling the mass, and separating the glycol.

5. In a process of the character described, dissolving casein in a liquid non-aqueous neutral substantially inert organic dispersing medium which is liquid at 110–140° C., adding an aldehyde and gelling the casein, and finally separating the dispersing agent.

6. In a process of the character described, dissolving casein in a non-aqueous neutral inert organic dispersing medium liquid at time of dispersing, adding a formaldehyde polymer to gel the casein, and separating the dispersing medium.

7. In a process of the character described, dissolving casein in a non-aqueous neutral substantially inert organic dispersing medium which is liquid at 110–140° C., and adding an aldehyde which is solid at room temperature to gel the casein.

8. In a process of the character described, dispersing a casein-type protein by heating the same in a non-aqueous liquid consisting of a polyhydric alcohol to which has been added a quantity of urea sufficient to substantially lower the dispersion temperature, said temperature not substantially exceeding about 130° C., adding an aldehyde and gelling the protein, cooling the mass, and removing the polyhydric alcohol.

9. In a process of the character described, dissolving a casein-type protein in a non-aqueous liquid consisting of a polyhydric alcohol at a temperature between room temperature and about 140° C., adding an aldehyde to react on the protein, and precipitating a pulverulent-form protein product in the polyhydric alcohol, and thereafter separating the protein product and the polyhydric alcohol.

10. In a process of the character described, dissolving a casein-type protein in a liquid consisting of a non-aqueous neutral inert organic dispersing medium which is liquid at 110°–140° C., and adding a protein hardening agent reacting on the protein.

11. In a process of the character described, dissolving a casein-type protein in a liquid consisting of a non-aqueous neutral inert organic dispersing medium which is liquid at 110°–140° C., and in the presence of urea adding a protein hardening agent reacting on the protein, and finally precipitating a pulverulent-form protein product in the dispersing medium.

12. In a process of the character described, dissolving a casein-type protein in a liquid non-aqueous neutral inert organic dispersing medium which is liquid at 110–140° C., adding a chemical hardening agent for the protein, and precipitating a pulverulent-form product in the dispersing medium.

13. In a process of the character described, dissolving a casein-type protein in a liquid non-aqueous neutral inert organic dispersing medium which is liquid at 110–140° C., and adding an aldehyde and gelling the protein.

JAMES P. DANEHY.

REFERENCES CITED

The following references are of record in the file of this patent:

UNITED STATES PATENTS

| Number | Name | Date |
| --- | --- | --- |
| 1,027,121 | Goldsmith | May 21, 1912 |
| 2,156,927 | Sturken | May 2, 1939 |
| 2,188,895 | Coleman | Feb. 6, 1940 |
| 2,331,434 | Sitzler | Oct. 12, 1943 |